8560X
L. GLEASON.
Carriage-Spring.
Patented Dec. 24, 1834
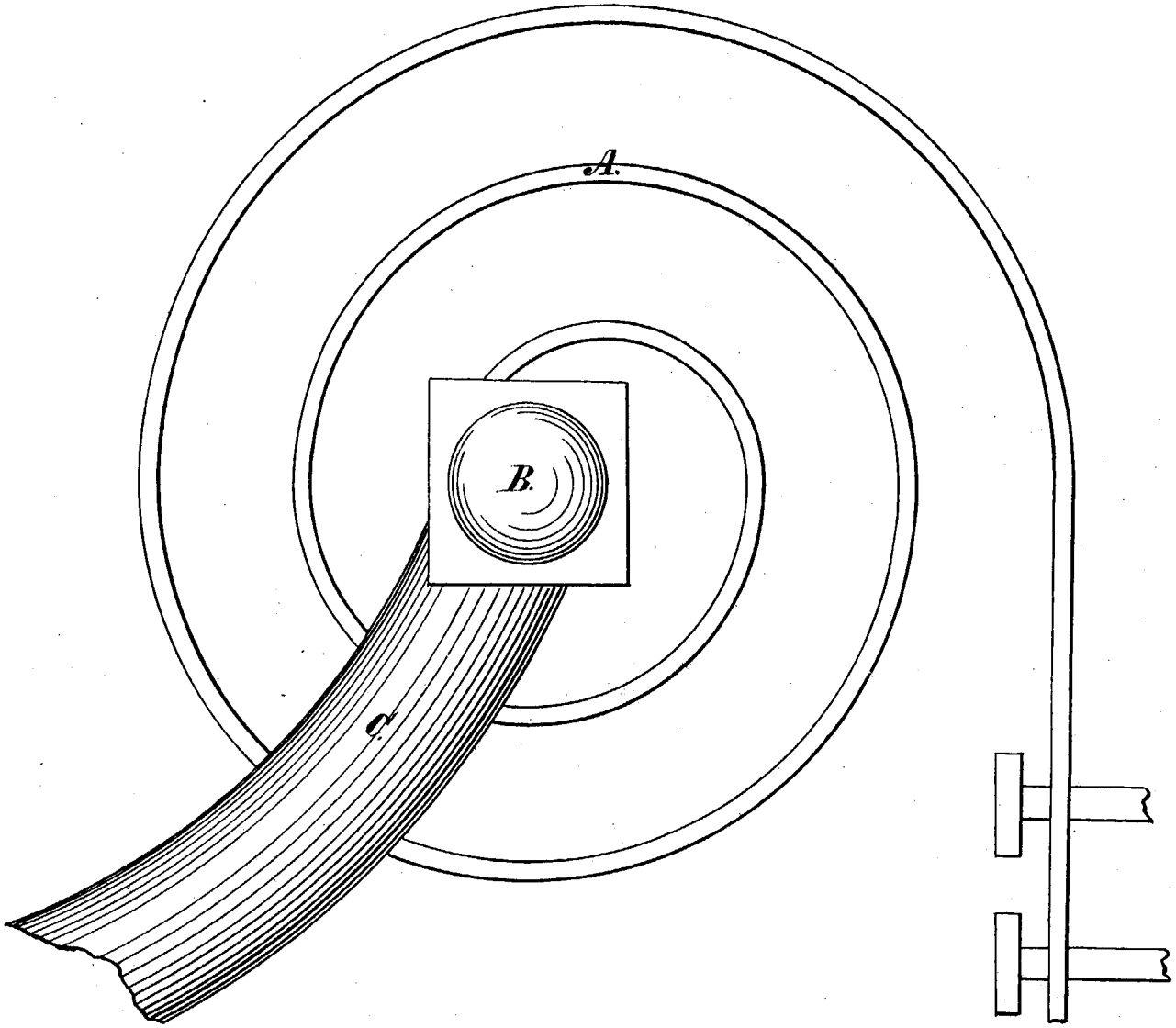
AM. PHOTO-LITHO. CO. N.Y. (OSBORNE'S PROCESS.)

Lyman Gleason
Letters Patent

The schedule referred to in these Letters Patent and making part of the same containing a description in the words of the said Lyman Gleason himself, of his improvement in the making or manufacturing of steel springs for the use of carriages of all kinds and waggons —

Specification or description ✕ for the cylinder lever power spring, for the use of two & four wheeled carriages & coaches of all descriptions - First, the spring A is to be made of steel spring temper, from one to eight inches wide & thickness in proportion, to be welded or fastened to a pin, B of cast or wrought iron, or any other metal sufficient to hold the lever, C The steel is to be rolled round the pin above mentioned, from one or more times, not so close as to have it touch or hit so hard as to prevent the spring, of the wheel. The out end of the steel to be fastened to any part of the carriage gearing that may be most convenient when applied - The other end is to be fastened to the pin where the lever is to be attached. Second, the lever is to be placed at each end of the pin, and the steel spring between; or the lever in the centre, and the spring on the outside. For heavy carriages the pin is to pass through the lever far enough to receive a rest or bearer; in such case, the out ends of the pins to be round. The lever is to be made of steel, cast or wrought iron, or any metal of sufficient strength for the lever. The lever to be seven inches or more in length. Third, for a single spring, it is to open at one end, as wide as the steel and fastened on each end of the pin. For a double spring, it may be fastened in the centre without splitting. The length of the lever must be regulated by the size of the carriage, or the place to which the out end is fastened. ✕ For further explination refference is had to the draft hereto annexed, which forms part of this schedule.

Witnesses
James T. Merritt
George W. Day

Lyman Gleason

[illegible] Drawing
(Patented 24 Decr 1834)

416 wds

Exd
[illegible]